Patented June 18, 1935

2,005,499

UNITED STATES PATENT OFFICE 2,005,499

RESINOUS COMPOUNDS

Rowland Hill, Cheadle Hulme, England, assignor to Imperial Chemical Industries Limited, Westminster, England No Drawing. Application July 19, 1930, Serial No. 469,275. In Great Britain August 3, 1929

10 Claims. (Cl. 134—26)

This invention relates to new compositions of matter. More particularly the invention relates to the manufacture of resinous compounds of the glycerol-phthalic-ester type and to a process for the production of such resins containing fatty oils, especially drying oils.

The incorporation of fatty oils, particularly of drying oils, into resins of the polybasic acid-polyhydric alcohol type (which are usually made from glycerol and phthalic anhydride) presents considerable difficulties, and various solutions of the problem have been proposed, all of which are open to objection. If a separate solvent medium is used, this must afterwards be removed, whilst the use of one of the ingredients as the solvent medium only allows the incorporation of small amounts of the oil.

It is an object of this invention to produce new and useful compositions of matter. Another object of the invention is the production of new compositions of matter containing fatty oils, aldehydes, polybasic acids and polyhydric alcohols. A further object of the invention is the incorporation of fatty oils in polyhydric alcohol-polybasic acid resins.

I have discovered that if the glycerol or other polyhydric alcohol be replaced wholly or to a substantial extent by products obtained by treating glycerol or other polyhydric alcohols with an aldehyde, e. g., paraformaldehyde, acetaldehyde, etc., the condensation with polybasic acid or anhydride (usually phthalic anhydride) gives, even in the presence of considerable proportions of fatty oil (e. g., a drying oil), a clear, homogeneous resin in which the oil is dispersed completely throughout the mass. Resins containing drying oils when produced in this manner have the property of drying (hardening) when exposed to air in thin films. The rate of drying may be increased with advantage by the incorporation of metallic compounds (driers) such as cobalt linoleate, etc. The smaller the proportion of the aldehyde to glycerol, the harder the resin and the better its drying properties.

In the preferred form of my invention, I heat together a mixture of the aldehyde compound of a polyhydric alcohol, previously prepared in a crude or purified condition, together with a polybasic acid or anhydride and a fatty oil (particularly a drying oil) with or without the addition of a polyhydric alcohol (the same as or different from that used in the preparation of the aldehyde compound).

In another form of my invention, I add the aldehyde to a mixture of polyhydric alcohol, polybasic acid or anhydride, and fatty oil (e. g., drying oil), and heat the mixture (if necessary under reflux or in a closed vessel until the aldehyde has entered into combination) until a homogeneous resinous mass is obtained. The whole reaction may, of course, be conducted in a closed vessel.

When formaldehyde is the aldehyde chosen, I prefer to reflux together a mixture of paraformaldehyde and polyhydric alcohol (usually glycerol). With acetaldehyde a closed vessel is preferable. Amongst other suitable aldehydes are crotonaldehyde, benzaldehyde, furfural, etc. In place of these aldehydes I may, of course, use substances which give an equivalent reaction with polyhydric alcohols, e. g., methylene dichloride and other aldehyde dihalides, methylal and other acetals, hexamethylenetetramine, acetylene in presence of a suitable catalyst etc (e. g., mercury salts).

The properties of the resins prepared in this manner may be controlled by varying the nature and proportions of the ingredients, especially the relative quantities and specific character of the aldehyde and of the drying oil. The ease with which the drying oil is incorporated is dependent upon the proportion of aldehyde used in the reaction, there being for a given amount of oil a minimum amount of aldehyde necessary to bring about homogeneous incorporation of the former. In general, the larger the amount of aldehyde, the easier will incorporation proceed. Incorporation is also influenced by the character of the oil in question; thus, linseed oil is more readily incorporated than tung oil. Mixtures of oils, e. g. linseed and tung oils have given good results.

Coating compositions can be made from the compositions of my invention by adding thereto suitable solvents, diluents, plasticizers (if needed), pigments, etc.

Varnishes prepared by this process dry rapidly in the air or at elevated temperatures to hard tough films possessing good flexibility. Varnishes with a quick initial set-up are obtained by using relatively small amounts of aldehyde and oil.

These resins are well adapted for application in varnish paint technique, as flexible varnish finishes for artificial leather, rubber leather, and rubber leather materials, and for other goods.

In addition to linseed and tung oils, fatty oils such as olive oil, cotton seed oil, fish oils and other oils, may be readily incorporated by this process.

The nature of the products may be varied by the addition of natural or synthetic resins such as colophony, ester gum, copal, phenol-formaldehyde resoles or urea-formaldehyde condensation products. In many cases, such additions help the incorporation of the oil.

The following examples illustrate but do not limit my invention. The parts are by weight.

*Example I*

45 parts of glycerol and 11 parts of paraformaldehyde are refluxed together for 2 hours at about 150° C., due precautions being taken to avoid loss of aldehyde, especially in the early stages. 100 parts phthalic anhydride and 117 parts tung oil are then added and the mixture is heated for 2 hours at about 160° C. Finally the temperature is raised and held at 225° C. for 2 hours. During this period the oil completely emulsifies. On cooling the product is obtained as a soft brown resin soluble in the usual organic solvents. In the presence of metallic driers such as cobalt linoleate it dries very rapidly to hard tough clear flexible films.

*Example II*

43 parts glycerol and 7 parts paraformaldehyde are refluxed together as above, and the mixture is then treated with 85 parts phthalic anhydride and 120 parts linseed oil. The mixture is heated to 225° C. with stirring, and held at this temperature for about 14 hours. On cooling, a pale brown moderately hard tough flexible resin is obtained which is perfectly transparent. It is soluble in the usual organic solvents, and dries rapidly in the air or at elevated temperature, preferably in the presence of metallic driers.

*Example III*

42 parts glycerol and 5 parts paraformaldehyde are refluxed together for about 2 hours at 150° C., 100 parts phthalic anhydride, 110 parts wood oil, 80 parts colophony and 8 parts glycerol are then added, and the mixture refluxed together at 170° C. for about 1 hour. The reflux is then removed and the temperature raised and held at 240° C. for 1-2 hours, the mixture being stirred efficiently during this period. The resulting resin is of a light brown color, and is moderately hard and tough. Varnishes prepared from this resin dry very rapidly to hard print resistant tough flexible films, either in the presence or absence of metallic driers.

An advantage of the invention lies in the method of incorporating fatty oils in polyhydric alcohol-polybasic acid resins. Another advantage of this invention lies in the production of new compositions of matter of the polyhydric alcohol-polybasic acid resin type which contain aldehydes and drying oils, and which have properties which render their use in coating and plastic compositions highly advantageous.

As many apparently widely different embodiments of this invention may be made without departing from the spirit and scope thereof, it is to be understood that I do not limit myself to the specific embodiments thereof except as defined in the appended claims.

I claim:

1. Process of making resins which comprises heating together a polyhydric alcohol, an aliphatic aldehyde, a fatty oil and a resinifying polycarboxylic acid as sole reactants.

2. The resinous reaction product of a polyhydric alcohol, an aliphatic aldehyde, a fatty oil, and a resinifying polycarboxylic acid as sole reactants.

3. The method of making a resin which comprises reacting a polyhydric alcohol with an aldehyde, adding a resinifying polycarboxylic acid and heating to resinification.

4. The resinous reaction product of a resinifying polycarboxylic acid and the product obtained by heating an aldehyde and a polyhydric alcohol, said acid, aldehyde and alcohol being the sole reactants.

5. The method for making a resin which comprises reacting a polyhydric alcohol with an aldehyde, adding fatty oil and a resinifying polycarboxylic acid and heating to resinification.

6. The resinous reaction product of a fatty oil, a resinifying polycarboxylic acid, and the product obtained by heating an aldehyde and a polyhydric alcohol, said oil, acid, aldehyde and alcohol being the sole reactants.

7. The method for making a resin which comprises reacting glycerol and formaldehyde, adding phthalic anhydride and a drying fatty oil, and heating to resinification.

8. The resinous reaction product of a drying fatty oil, phthalic anhydride, and the product obtained by heating glycerol and formaldehyde, said oil, anhydride, glycerol and formaldehyde being the sole reacting ingredients.

9. The method for making a resin which comprises reacting a resinifying polycarboxylic acid anhydride and an acetal of a polyhydric alcohol as sole reactants.

10. The resinous reaction product of a resinifying polycarboxylic acid anhydride and an acetal of a polyhydric alcohol, as sole reacting ingredients.

ROWLAND HILL.